(12) United States Patent
Milesi et al.

(10) Patent No.: US 11,440,238 B2
(45) Date of Patent: *Sep. 13, 2022

(54) PREFORM HEATING SYSTEM

(71) Applicant: SMI S.P.A., Bergamo (IT)

(72) Inventors: Giovanni Milesi, Bergamo (IT); Ivan Cortinovis, Bergamo (IT)

(73) Assignee: SMI S.P.A., Bergamo (IT)

( * ) Notice: Subject to any disclaimer, the term of this patent is extended or adjusted under 35 U.S.C. 154(b) by 139 days.

This patent is subject to a terminal disclaimer.

(21) Appl. No.: 16/931,623

(22) Filed: Jul. 17, 2020

(65) Prior Publication Data

US 2021/0023763 A1 Jan. 28, 2021

(30) Foreign Application Priority Data

Jul. 22, 2019 (IT) .......... 102019000012549
Jan. 24, 2020 (IT) .......... 102020000001384

(51) Int. Cl.
| | |
|---|---|
| *B29C 49/68* | (2006.01) |
| *B29C 35/08* | (2006.01) |
| *B29C 49/42* | (2006.01) |
| *B29B 13/02* | (2006.01) |
| *B29B 13/08* | (2006.01) |
| *B29C 49/78* | (2006.01) |

(52) U.S. Cl.
CPC .......... *B29C 49/68* (2013.01); *B29B 13/024* (2013.01); *B29B 13/08* (2013.01); *B29C 35/0805* (2013.01); *B29C 49/78* (2013.01); *B29C 2035/0822* (2013.01)

(58) Field of Classification Search
CPC . B29C 49/68; B29C 49/4236; B29C 49/6418; B29C 49/4205; B29C 2035/0822
See application file for complete search history.

(56) References Cited

U.S. PATENT DOCUMENTS

| | | | | |
|---|---|---|---|---|
| 3,975,618 | A * | 8/1976 | Goos .................. | B29B 13/024 392/419 |
| 8,303,290 | B2 * | 11/2012 | Feuilloley .......... | B29B 13/024 425/526 |
| 10,857,722 | B2 * | 12/2020 | Cochran ............ | B29C 49/78 |
| 2006/0118983 | A1 * | 6/2006 | Cochran ............ | B29C 49/68 264/492 |
| 2010/0089906 | A1 * | 4/2010 | Plantamura ........ | B29B 13/023 219/645 |

(Continued)

FOREIGN PATENT DOCUMENTS

| | | |
|---|---|---|
| DE | 102006015853 A1 | 10/2007 |
| JP | 05154899 A | 6/1993 |

*Primary Examiner* — Robert B Davis
(74) *Attorney, Agent, or Firm* — Cantor Colburn LLP

(57) ABSTRACT

The present invention relates to a heating system for preforms upstream of a blowing or stretch-blowing machine, in particular a heating system using monochromatic infrared radiation, preferably laser-generated.

In particular, the invention relates to a heating system (301) for preforms (P), comprising a carousel for treating the preforms (P) comprising a plurality of heating elements (304) configured to be inserted either inside or outside each preform (P) and to radiate electromagnetic radiation in the infrared field which forms, in such a device, a disc of radiation according to a radial symmetry which departs from the center of the axis of the preform and which appropriately converges and diverges.

15 Claims, 14 Drawing Sheets

(56) References Cited

U.S. PATENT DOCUMENTS

| | | | |
|---|---|---|---|
| 2011/0135288 A1* | 6/2011 | Winzinger | B29B 13/024 |
| | | | 392/416 |
| 2012/0269918 A1* | 10/2012 | Winzinger | B29B 13/024 |
| | | | 425/174.4 |
| 2013/0011807 A1* | 1/2013 | Winzinger | B29C 49/786 |
| | | | 392/428 |
| 2017/0173846 A1* | 6/2017 | Chen | B29C 49/6418 |
| 2020/0397932 A1* | 12/2020 | Milesi | B67C 7/0073 |
| 2021/0229338 A1* | 7/2021 | Milesi | B29C 49/68 |

* cited by examiner

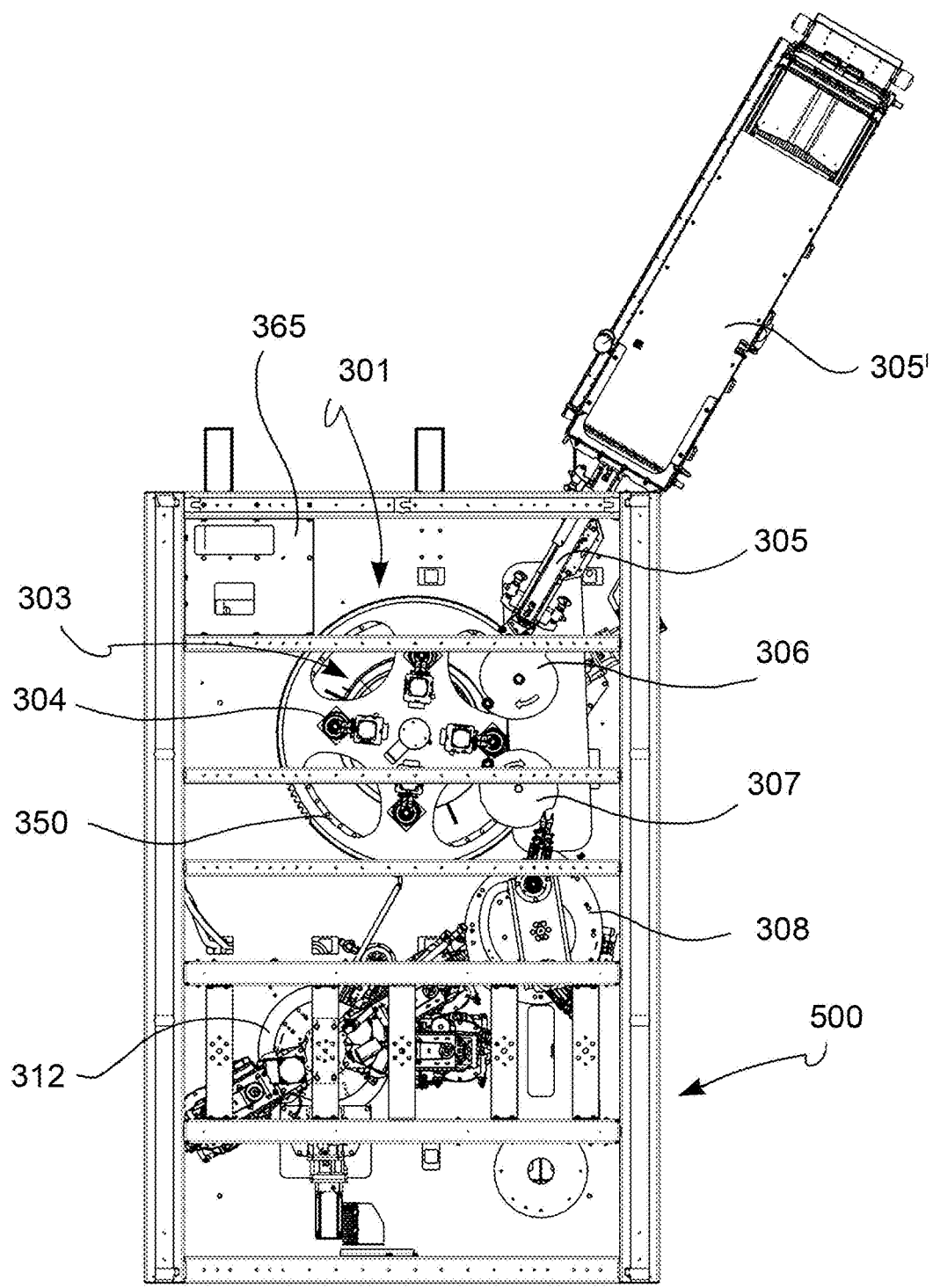
FIG. 1bis

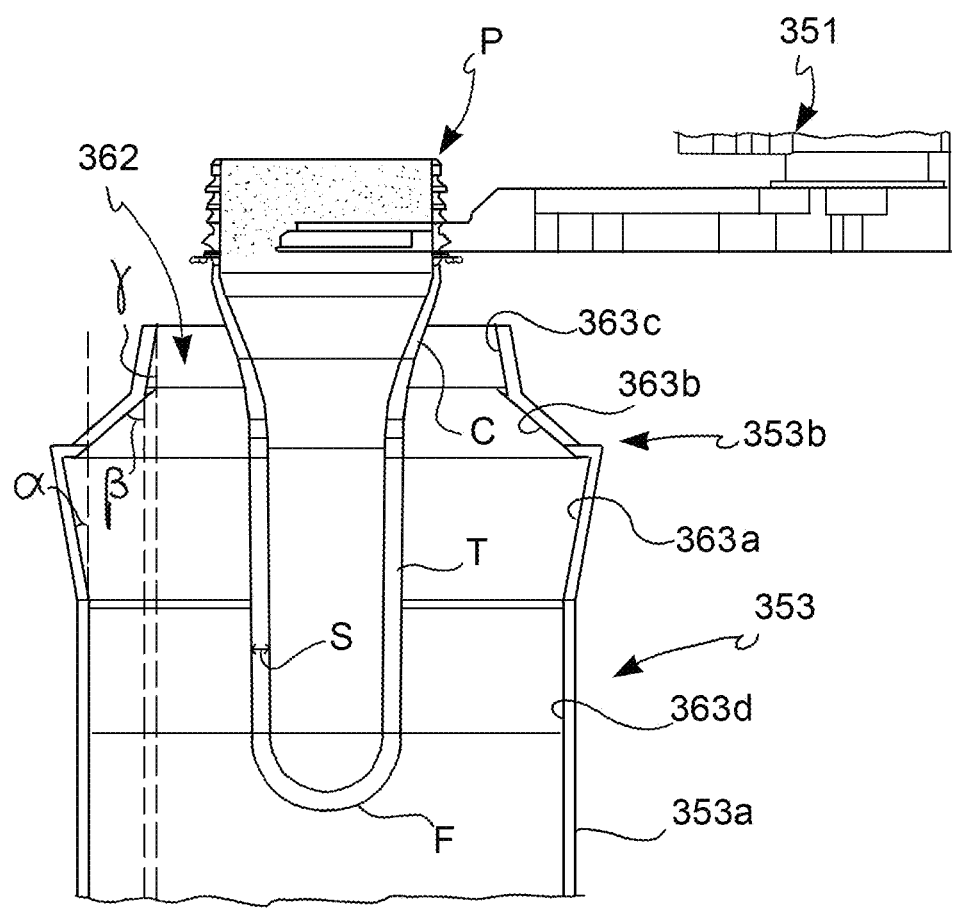
FIG.11bis

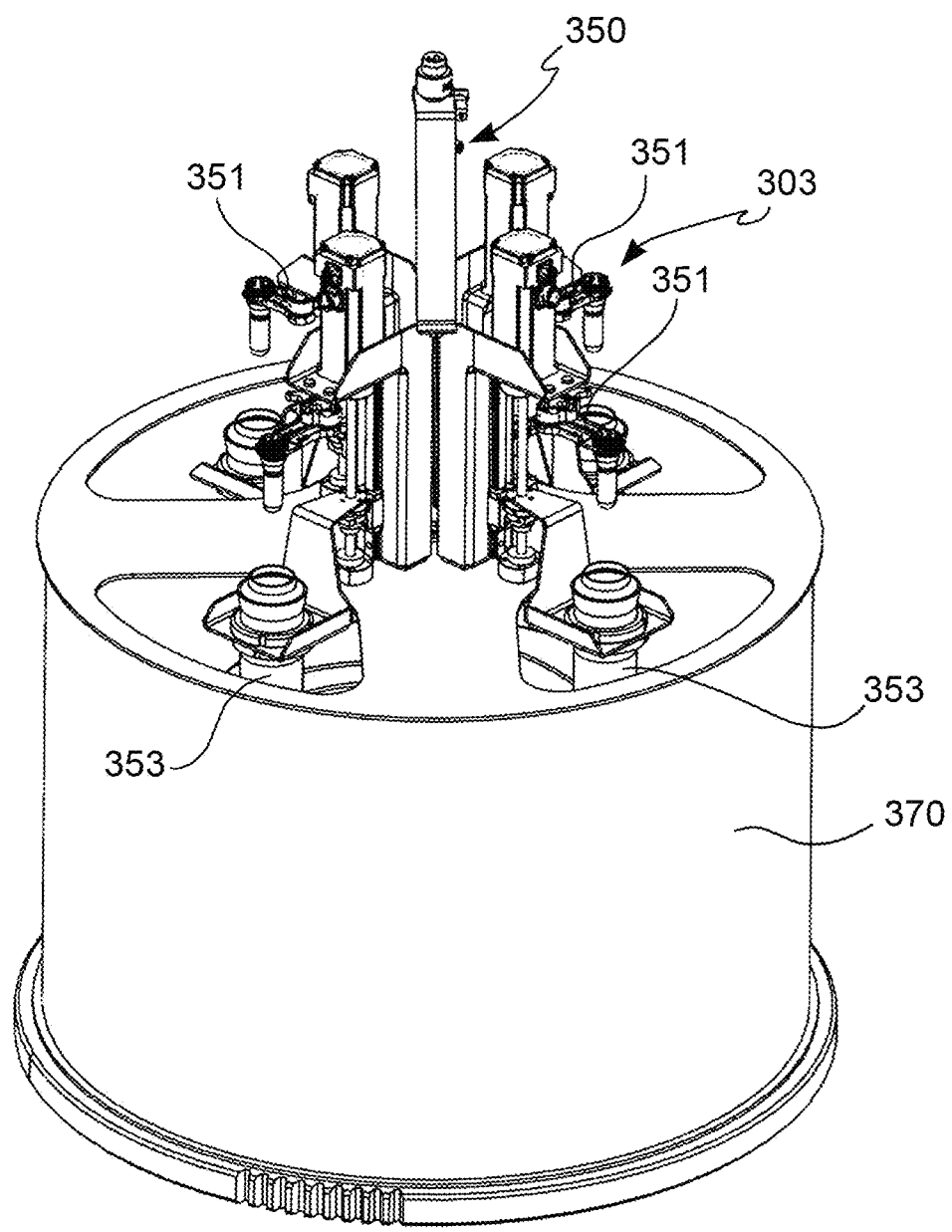
FIG. 12bis

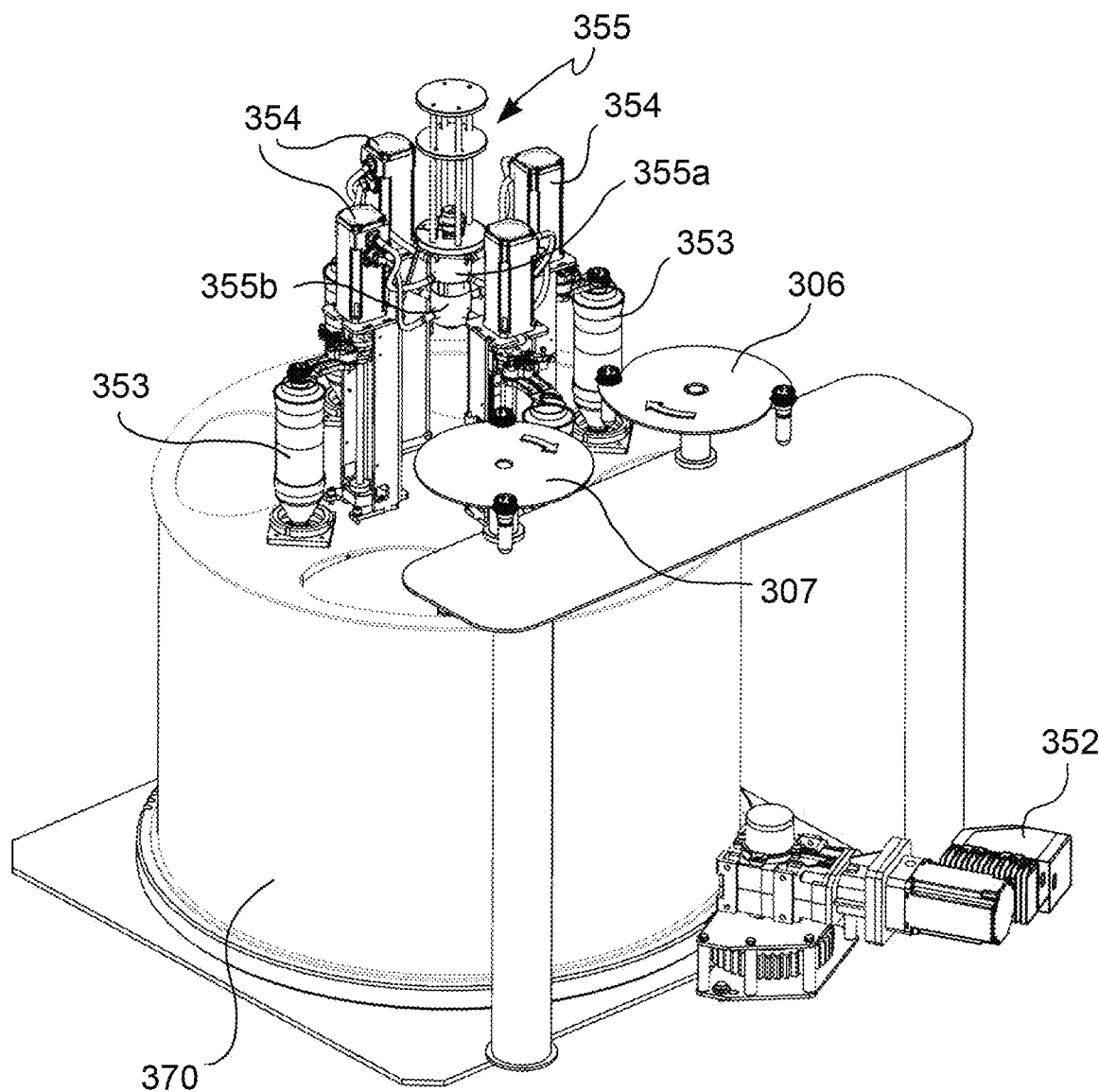
FIG. 13bis

PREFORM HEATING SYSTEM

CROSS REFERENCE TO RELATED APPLICATIONS

This application is related to and claims the benefit of Italian Patent Application No. 102019000012549 filed on Jul. 22, 2019 and Italian Patent Application No. 102020000001384 filed on Jan. 24, 2020, where the entire contents of both said applications are incorporated herein by reference.

FIELD OF THE INVENTION

The present invention relates to a heating system for preforms upstream of a blowing or stretch-blowing machine, in particular a heating system using monochromatic infrared radiation, preferably laser-generated.

BACKGROUND ART

In a packaging line of beverages into plastic bottles, the first step consists of heating the preforms from which the bottle will then be blown until their softening point.

This operation is normally carried out in special ovens in which the preforms are passed in a row at a reduced pitch and in which infrared radiation emitting lamps are arranged which heat them to the desired temperature.

Such ovens are of large size because the preform path must be long enough to allow the required heating times. Indeed, the heat is diffused by the lamps along the path of the preforms, so that, despite the provision of adequate reflective surfaces, the dispersion of heat into the environment is high.

The infrared lamps are typically tungsten lamps which have a maximum emission efficiency of 3000° K. However, considering that the various plastic materials have energy absorption spectra in rather narrow wavelength ranges, while tungsten lamps operated at maximum efficiency emit energy at very various wavelengths, only a small part of the energy is effectively absorbed by the preforms, the remainder being dispersed in the environment. For example, when considering PET preforms, which account for about 95% of the global market, the power used under these conditions for heating compared to the power effectively stored by the preform has values which indicate low efficiency, no more than 15% of the emitted electricity being effectively converted into thermal energy absorbed by the preforms.

The dispersion of unusable thermal energy from the preforms also requires an efficient refrigeration system to avoid overheating the system, which leads to further energy waste.

Therefore, the need is felt to provide a preform heating system which is more energy-efficient and which is possibly smaller than the ovens currently on the market.

Furthermore, the preforms are currently heated by a grid of lamps which develop radiation from an overall flat surface and, therefore, does not allow homogeneous radiation of the cylindrical container.

SUMMARY OF THE INVENTION

The problem underlying the present invention is thus to provide a preform heating system which solves the aforesaid drawbacks inherent in the known technology and which allows to obtain energy savings while optimizing the preform heating.

In particular, the present invention suggests an irradiation concentrated on the single preform, so as to avoid irradiation dispersed in the environment.

The present invention further uses a monochromatic source of appropriate wavelength, chosen from those with an absorption coefficient for PET or other polyester or polyolefin resins suitable for appropriate heating of the material. Such a monochromatic radiation is available based on currently known technologies.

The heating system of the present invention follows the cylindrical geometry of the object to be heated, i.e. the preform, so as to irradiate the preform according to a cylindrical geometry, from the inside or, alternatively, from the outside, and to concentrate the radiation towards the inside of the preform.

The heating system of the invention is also applicable to preforms made of polyester resins, such as, but not limited to, PET (Polyethylene Terephthalate), PEF (Polyethylene 2,5 furandicarboxylate), PLA (poly(lactic acid)), PEN (polyethylene naphthalate) and polyolefin resins, such as PE (polyethylene), PP (polypropylene) also with added copolymers.

The object of the present invention is thus a preform heating system as set out in the appended claims, the definitions of which form an integral part of the present description.

In particular, a first object of the invention is a heating system for preforms, comprising a revolving carousel for treating the preforms, where the carousel comprises a plurality of heating elements configured to be inserted into each preform or be arranged outside each preform and to radiate electromagnetic radiation in the infrared field which forms, in such a device, a disc of radiation according to a radial symmetry which departs from the center of the axis of the preform.

A second object of the invention is a heating system comprising a plurality of heating elements, each of said heating elements being configured to heat a preform individually from the inside or the outside, the system comprising a plurality of external reflecting elements, each of said reflecting elements being configured to radiate a preform radially towards the center and individually from the outside with the radiation part emitted by the corresponding heating element, not absorbed by the preform and transmitted through the thickness of the preform.

A third object of the invention is a heating system comprising a plurality of heating elements, each of said heating elements being configured to heat a preform individually from the inside or the outside, where said heating elements are powered by laser devices.

A further object of the invention is a diffuser of infrared radiation which runs through the inside of the preform diffusing the radiation according to a defined radiant geometry and intensity to optimize the incidence of the radiation itself.

A yet further object of the invention is a heating system comprising a plurality of heating elements configured to illuminate a preform individually from the outside and to distribute the radiation emitted by a laser source on an optical path aimed at concentrating such a radiation towards the central axis of the preform.

Further features and advantages of the present invention will become apparent from the description of some exemplary embodiment, given here by way of non-limiting example.

BRIEF DESCRIPTION OF THE DRAWINGS

FIG. 1*bis* is a top plan view of a different embodiment of the plastic bottle blowing system comprising the heating system of the invention in a compact version, where the rotary oven is inside the machine;

FIG. 11*bis* is a side section view of a detail in FIG. 11;

FIG. 12*bis* is the perspective view in FIG. 12 completed with containment base;

FIG. 13*bis* is the perspective view in FIG. 13 completed with containment base.

DETAILED DESCRIPTION OF THE INVENTION

Figure 1:
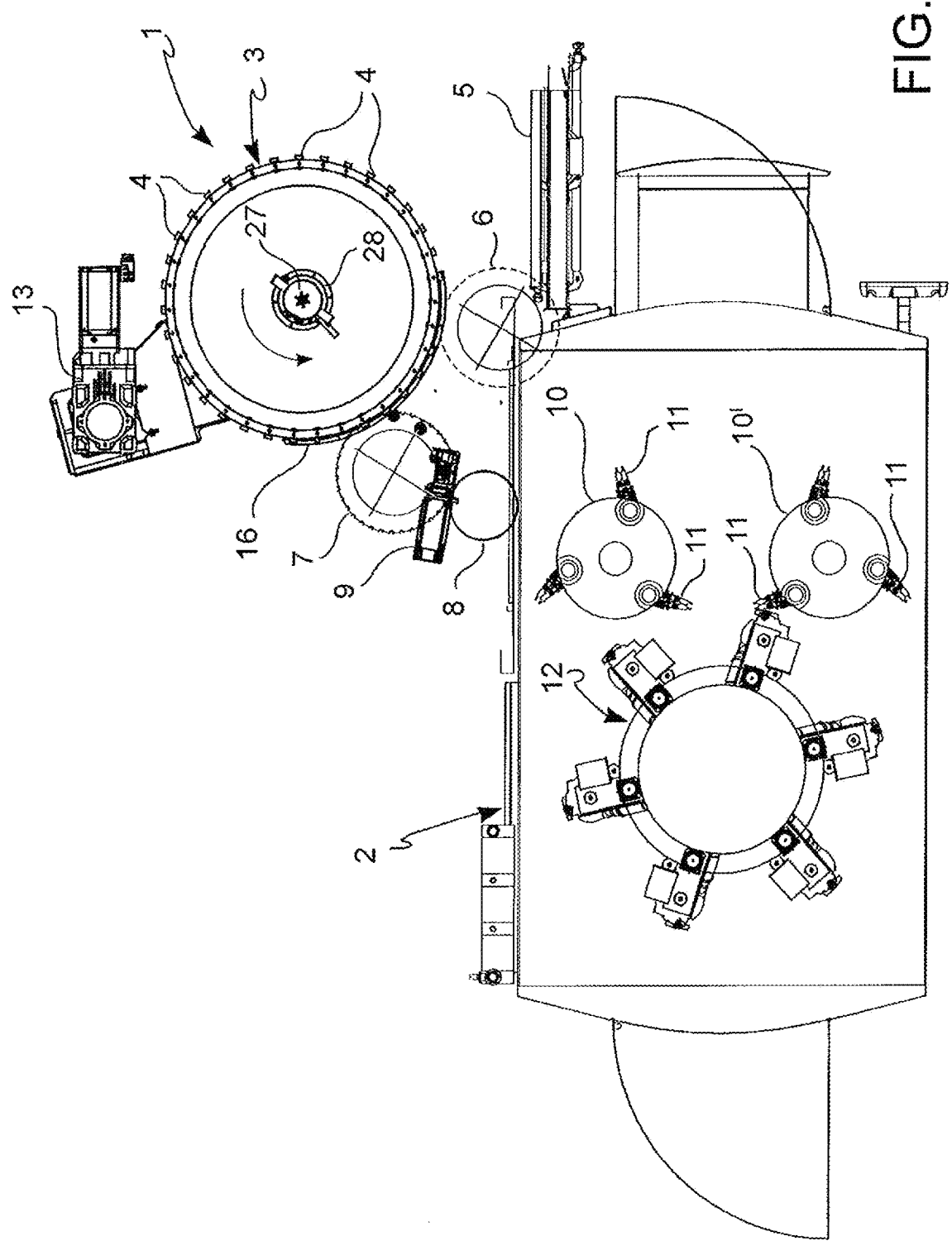
FIG. 1 is a top plan view of a plastic bottle blowing plant comprising the heating system of the invention.

With reference to FIGS. 1 to 9, a preform heating system according to the invention, coupled to a blowing machine 2, is indicated by reference numerals 1, 101, 201.

The heating system 1 comprises a carousel 3 comprising a plurality of heating elements 4 about its periphery, where each of which is configured to heat a preform individually from the inside. Although the one shown is the most advantageous, in other embodiments, the system 1 could comprise a linear conveying element comprising said plurality of heating elements.

The heating system 1 further comprises a handling system of the preforms P into and out of heating system 1. The preform handling system comprises:
- a conveyor 5 which feeds the cold preforms in input to at least one first distribution star 6 coupled to carousel 3 for transferring the preforms P to be heated to the carousel 3;
- a second distribution star 7 and a third distribution star 8 for transferring the heated preforms P to the blowing machine 2. A control and ejection device 9 of the faulty preforms P is arranged between the second 7 and the third distribution star 8.

The blowing machine 2 will comprise, in turn, distribution stars 10, 10' provided with handling grippers 11 of the preforms P and of the blowing carousel 12.

A heating system 1 comprises a support frame 14 onto which the carousel 3 and the distribution stars 6, 7, 8 are placed. The carousel 3 is rotated by a drive 13.

The heating elements 4 are vertically movable and can take a raised disengagement position of the preforms P and a lowered position in which the heating elements 4 are inserted into the respective preforms P.

The vertical movement of each of the heating elements 4 is operated by a dedicated drive 15 (FIG. 3), preferably a stepper motor, servomotor, linear motor, or brushless motor. In this manner, it is possible to operate a specific law of motion to optimize the heating inside the preforms P.

The carousel 3 further comprises, along its periphery, a plurality of reflecting elements 17, arranged under the heating elements 4 and vertically movable between a lowered disengagement position of the preforms P and a raised position in which each reflecting element 17 is placed outside the respective preform P below the neck C of the preform.

The vertical movement of the reflecting elements 17 is actuated by means of interference with a cam 16 arranged along an arc of a circle at the periphery of the carousel 3, between a position immediately upstream of the distribution star 7 for picking the heated preforms P and a position immediately downstream of the distribution star 6 for feeding the preforms P to be heated, where the definitions "downstream" and "upstream" refer to the direction of rotation of carousel 3.

Figure 4:
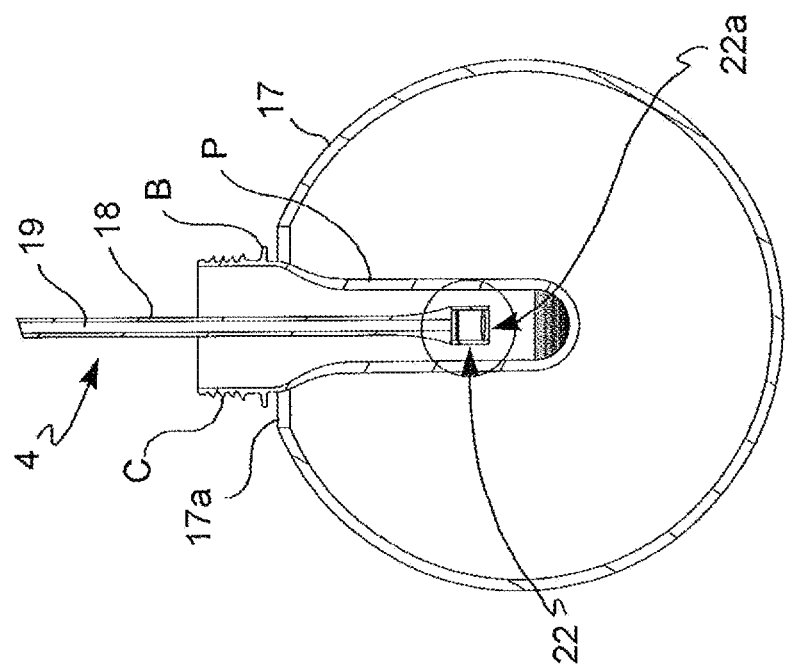
FIG. 4 is a side section view of a detail of the embodiment in FIG. 3.
Figure 3:
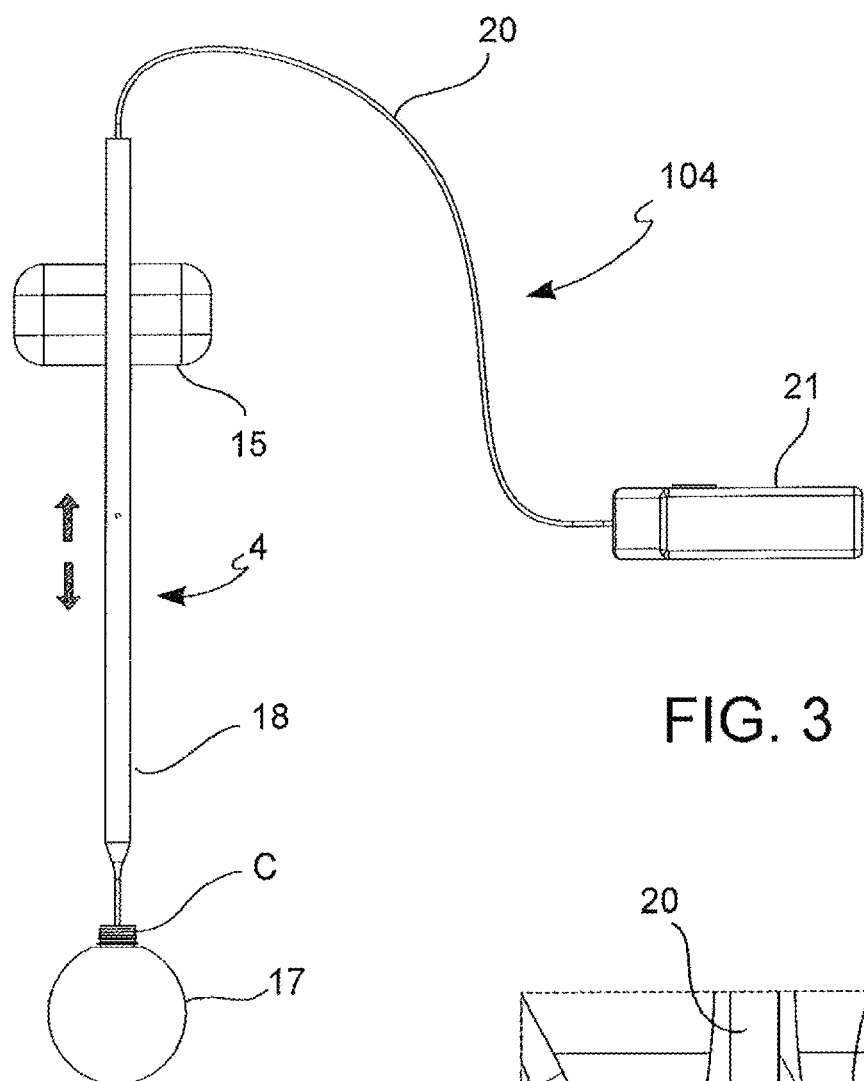
FIG. 3 is a diagrammatic side view of a preform heating member in a first variant.
Figure 5:
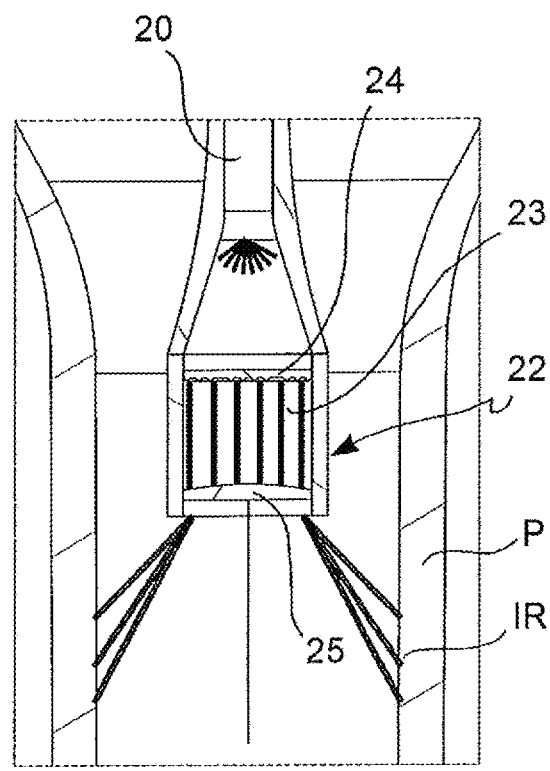
FIG. 5 is a side section view of a detail (radiation diffuser) of the heating member of the preforms of the invention.
Figure 6:
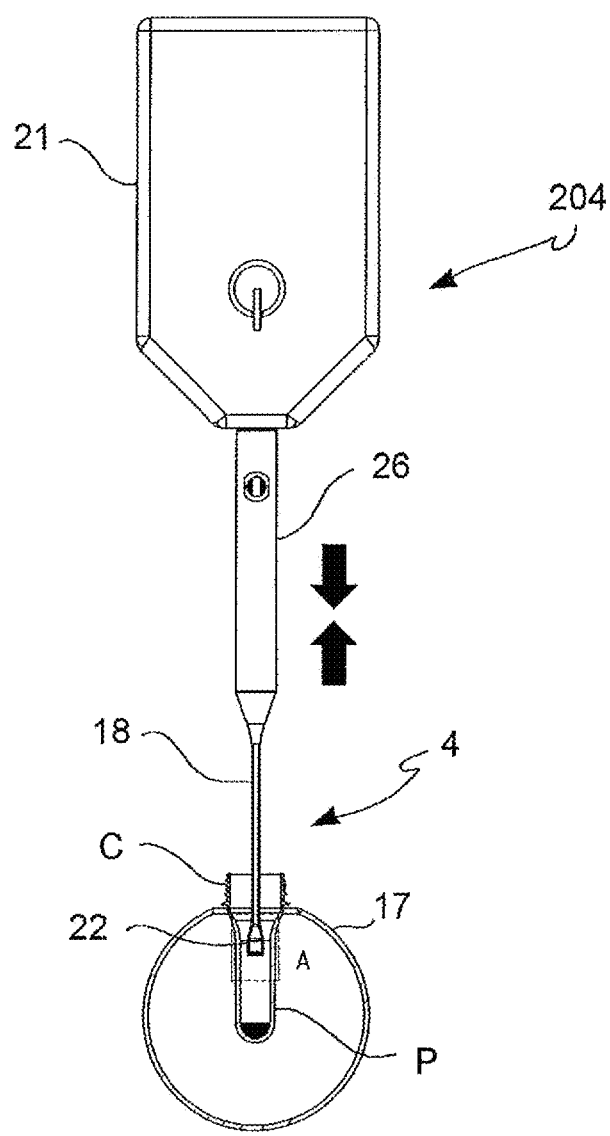
FIG. 6 is a diagrammatic side view of a preform heating member comprising a reflecting element.

In some embodiments, shown in FIGS. 3, 4, and 6, the reflecting elements 17 have a substantially spherical shape and comprise an opening adapted to the passage of the preform P, on the upper surface 17a thereof.

Figure 7:
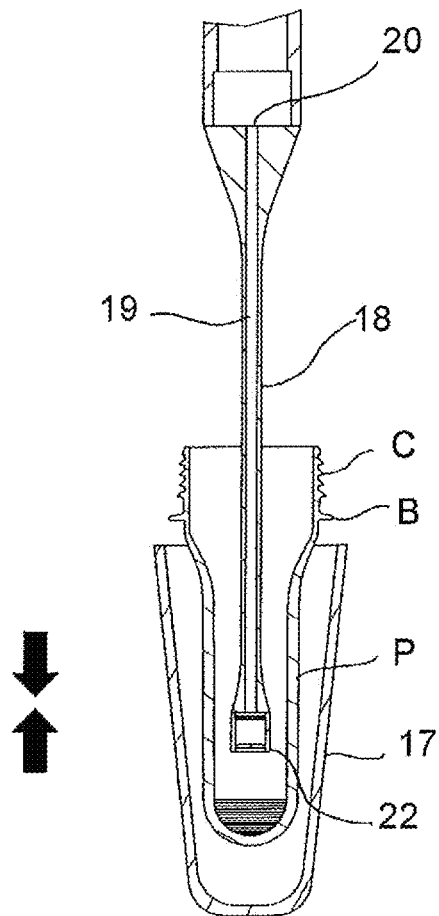
FIG. 7 is a side section view of a detail of the embodiment in FIG. 6 in another possible geometry.

In other embodiments, as shown in FIG. 7, the reflecting elements 117 are shapes as a small glass or tube, preferably flared upwards.

In all embodiments, the reflecting elements 17, 117 comprise an inner reflecting surface adapted to convey the thermal energy, radiated by the heating elements 4 and crossing the wall of the preform P, towards the outer wall of the preform P itself. The reflecting inner surface can be made, for example, by means of a silver-coated, gold-coated, or other highly reflecting material.

Figure 2:
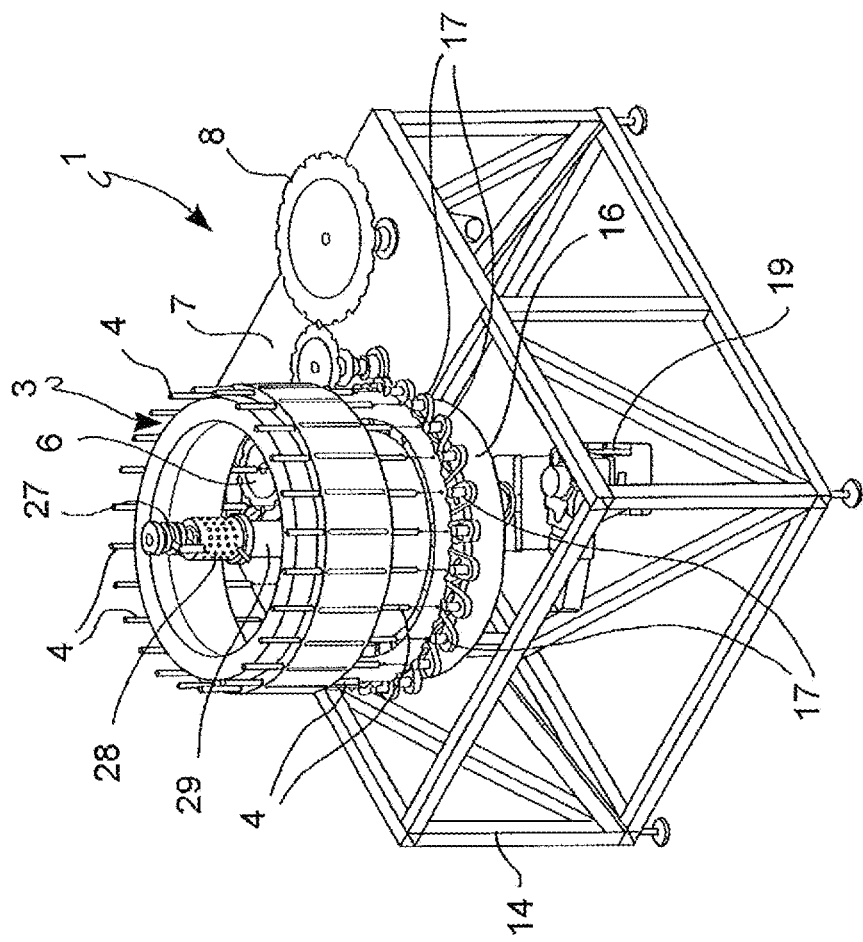
FIG. 2 is a perspective overall view of the preform heating system according to the invention.
Figure 8:
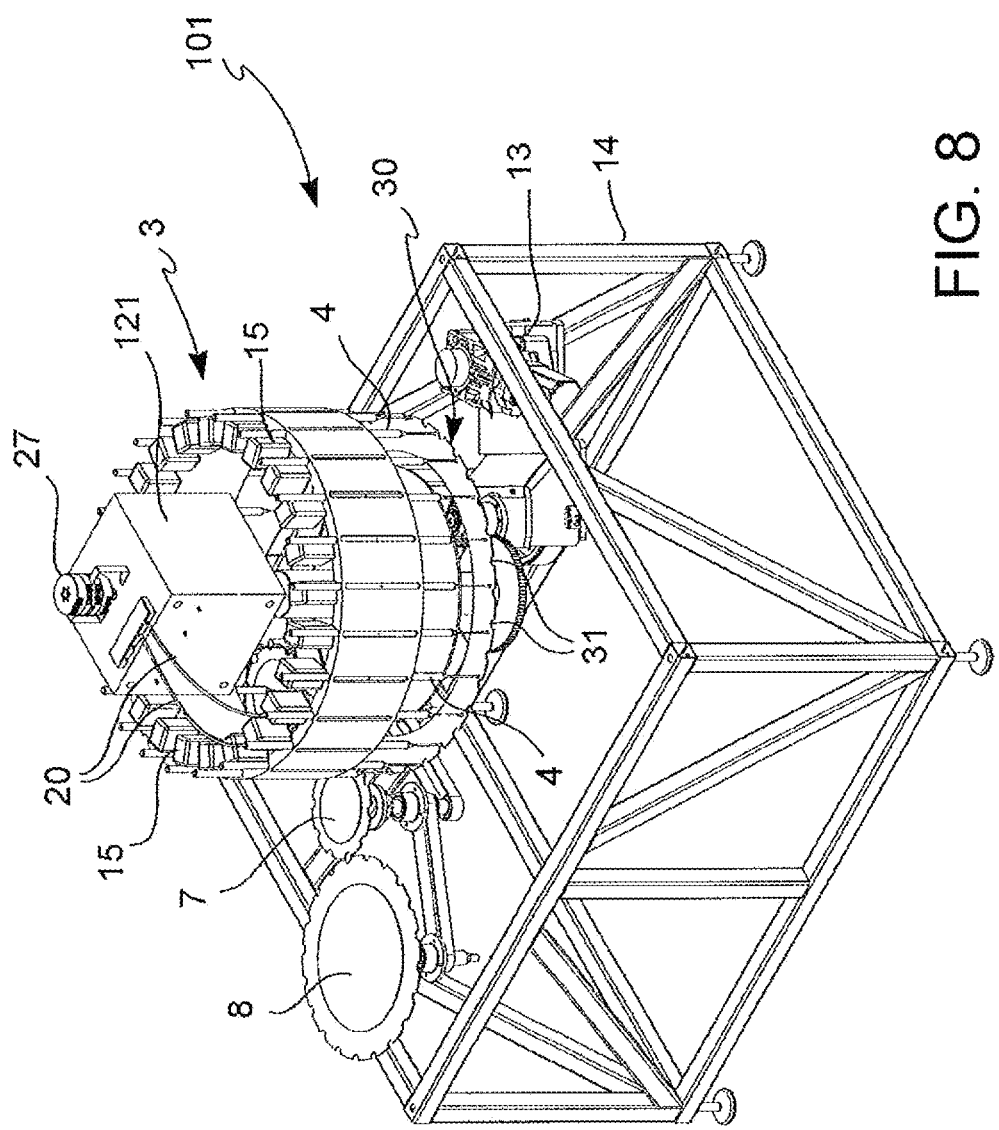
FIG. 8 is a perspective overall view of the entire preform heating system in a second embodiment of the invention.
Figure 9:
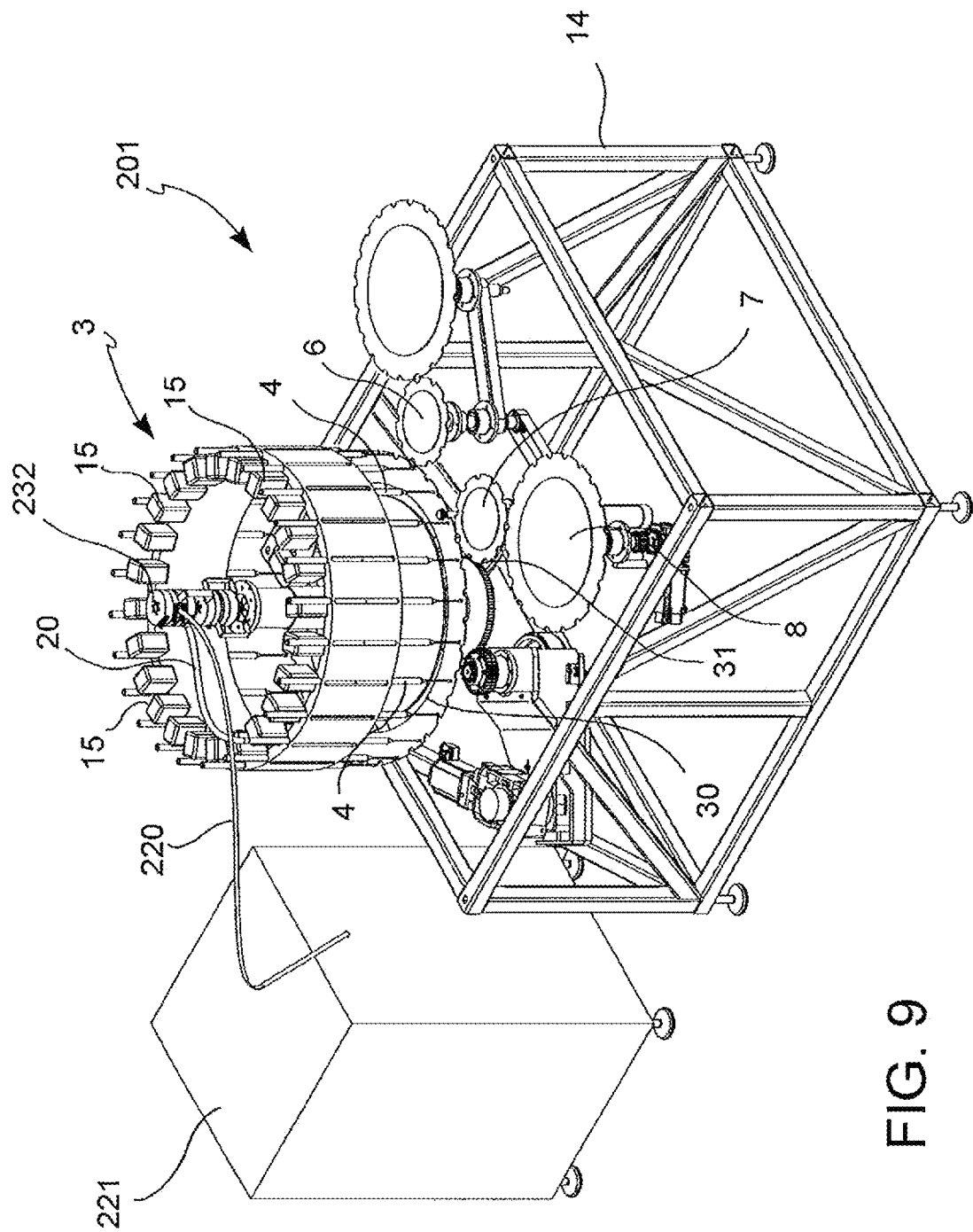
FIG. 9 is a perspective overall view of the preform heating system in a third embodiment of the invention.

The carousel 3 further comprises a gripping and supporting member 30 of the preforms P (not visible in the simplified view in FIG. 2, but visible in FIGS. 8 and 9). Such a conventional gripping and supporting member comprises a plurality of semicircular recesses 31, one for each preform P, configured to support the preform P from the finishing element B, and typically a contrast profile (not visible) which holds the preform P against said semicircular recesses during the path between the feeding star 6 and the picking star 7. The gripping and supporting element 30 is placed at an appropriate height between the reflecting elements 17 and the heating elements 4.

The heating elements 4 comprise a rod 18 within which a path 19 is defined for the conduction of electromagnetic radiation.

In preferred embodiments, such a path 19 houses an electromagnetic waveguide 20, typically an optical fiber, connected to a source of electromagnetic radiation collimated in the infrared field, having predetermined wavelengths. Preferably, such a source of electromagnetic radiation is a laser device 21, in particular, a device with diode source, semiconductor source, or fiber source.

The assembly consisting of a heating element 4, the respective waveguide 20, and the electromagnetic radiation source 21 constitutes a heating element 104.

In particularly preferred embodiments, the electromagnetic radiation emitted by laser 21 is in the wavelength range of 1620-2100 nm, preferably 1652-1674 nm and/or 1701-1880 nm and/or 1907-1919 nm and/or 1951-2000 nm and/or 1803-1813 nm and/or 1903-1913 nm and/or 1941-1961 nm and/or 1972-2012 nm. Even more preferably the electromagnetic radiation has a wavelength of 1661 nm and/or 1721 nm and/or 1908 nm and/or 1951 nm and/or 1992 nm, the wavelength of about 1950-1955 nm being the absolute preferred. Indeed, it was experimentally calculated on transparent PET bottles of various thicknesses, pigmented PET of various thicknesses, recycled PET and PET filled with inert additives, such as titanium dioxide (which has the peculiarity of preventing the passage of ultraviolet light) that in the above wavelength intervals the absorption of thermal energy is optimized both by direct radiation from the inside and by the radiation reflected by the reflecting elements 17, 117. Working with electromagnetic radiation having the indicated wavelengths also avoids the risk of bleaching of the material, which is particularly critical when using transparent PET.

The rod 18 is vertically movable by the drive 15.

The rod 18 ends at the lower end at a distal end 22 with a terminal opening 22a and comprising an electromagnetic radiation diffuser 23. The diffuser 23 is made of a transparent material with a suitable refractive index to radiation in the infrared field. For example, the diffuser 23 can be made of a material chosen from Silicon, Germanium, Molten Silica, Magnesium Fluoride, Calcium Fluoride, Zinc Oxide, Barium Fluoride, Potassium Bromide, Cesium Iodide, Potassium Chloride, Cadmium Tellurium, Crystallized Alumina, Gallium Arsenide, Sodium Chloride, BK7 Glass, Lithium Fluoride, Thallium Bromoiodide, Zinc Selenide, and Zinc Sulfide.

The diffuser 23 comprises a first lens 24 to collimate the infrared radiation rays transmitted by the waveguide 20 and a second lens 25 with a curvature configured to diffuse the light collimated by the first lens 24 according to a predefined diffusion angle. Such a diffusion angle is preferably between 0° and 90° with respect to the axis of the guide 18. The preferred value of said angle, which determines the angle of incidence of radiation, will be determined as a function of the selected wavelength. Furthermore, is possible to operate by utilizing the beneficial effects in terms of absorption and radiation confinement which can be achieved from the Brewster angle and the critical waveguide angle, having found that PET is a homogeneous dielectric.

In this manner, a cylindrical IR infrared radiation beam with a height of about 1.0-2.5 cm is directed onto the inner surface of the preform P. The thermal radiation which is not directly absorbed by the preform material and then passes through it is then captured and reflected by the reflecting element 17, 117 placed outside.

Instead, the part of the radiation which is reflected by the inner surface of the preform returns to concern the inner surface of the preform itself, being its path inside the cavity of the preform itself.

The rod 18 is moved by the drive 15 along a vertical path according to a predefined law of motion, so as to optimize the heating time as a function of the geometric features of the surface to be irradiated. Homogeneous heating of the entire preform is achieved in this manner.

The laser source also has its own modularity of intensity which, together with the variation of the sliding speed of the optical diffuser, allows a wide regulation of the process.

FIG. 6 shows a different embodiment, in which the laser device 21 is not placed in a remote position with respect to the heating element 4—as in the embodiment described above—but is positioned above it.

In such an embodiment, the rod 18 is associated with a telescopic tube 26 which connects the path 19 inside the rod 18 to the laser device 21. The telescopic tube 26 will then comprise an upper fixed section, connected to the laser device 21, and a movable lower section connected to the rod 18. The rod 18 will then be moved by the drive 15 (not shown in FIG. 6) either directly or by associating the drive 15 to the movable section of telescopic tube 26.

The carousel 3 further comprises an electric collector 27 for energizing the laser devices 21 and preferably a system for cooling, e.g. water cooling, the heating elements 4, and the reflecting elements 17, 117 (not shown), connected to a refrigerant fluid manifold 28. Preferably, the electric collector and the coolant manifold 28 are placed above the carousel, in a coaxial position with respect to the rotation shaft 29.

FIGS. 8 and 9 show two different embodiments of the invention, in which a single high-power laser device is provided, instead of having a laser device 21 for each heating element 4.

In the description below, the parts corresponding to those described above for the first embodiment have been assigned the same reference numbers.

For the sake of simplicity of illustration, FIGS. 8 and 9 do not show the reflecting devices 17, 117, which however are arranged as in the previous embodiment below the gripping and supporting system 30 of the preforms P.

With reference to FIG. 8, the only difference between the embodiment shown here and the one previously described is the arrangement of a single laser device 121 placed on the carousel 3 and energized by the electrical collector 27 at industrial voltage power.

The laser device 121 will have sufficient power to send the amount of electromagnetic radiation required for the operation of the individual heating elements 4.

For this purpose, the laser device 121 is connected to the heating elements 4 via a plurality of waveguides 20, one for each heating element 4.

With reference to FIG. 9, the only difference between the embodiment shown here and those previously described is the arrangement of a single laser 221 device outside the carousel 3.

The laser device 221 will have sufficient power to send the amount of electromagnetic radiation required for the operation of the individual heating elements 4.

For this purpose, the laser device 221 is connected via a single electromagnetic waveguide 220 to a waveguide collector 232 on the carousel 3. A plurality of waveguides 20 depart from such a rotating collector 232 to connect the collector 232 with each of the heating elements 4.

In given embodiments, the same path 19 used for electromagnetic energy for heating may also comprise UV-C radiation transmission means, e.g. a radiation emitted by LEDs or LASER, so as to achieve the simultaneous sterilization of preforms. Such a solution is described, for example, in Italian patent application No. 102019000009591 filed on Jun. 20, 2019 by the same Applicant.

A different embodiment of the invention, which involves heating the preforms from the outside will now be described, with reference to FIGS. 1bis, 10, 11, 11bis, 12, 12bis, 13, and 13bis.

FIG. 1bis shows a compact machine in which the heating system of the invention is integrated with the preform blowing carousel. It is worth noting that the heating system 301 described below can also be applied to a non-compact system as shown in FIG. 1, i.e. be external to the preform blowing machine.

It is worth noting that although the heating system 301 is a rotary system, there is nothing to prevent the application of a similar heating system in a continuous linear configuration.

The heating system 301 comprises a carousel 303 which supports a plurality of heating elements 304 along its periphery, where each of said heating elements 304 is configured to individually heat a preform P by radially sending the electromagnetic radiation from the outside to the inside of the preform.

The heating system 301 further comprises a handling system of the preforms P into and out of heating system 304. The preform P handling system comprises:
- at least one distribution star 306, provided with the appropriate pitch, coupled to the carousel 303 to feed the preforms P to be heated to appropriate grippers 351 placed on the carousel 303, the distribution star 306 receiving the preforms P from a feeder 305 placed downstream of a preform orienting device 305';
- a second distribution star 307 to extract the heated preforms P from the carousel 303 and a third distribution star 308, able to vary the pitch of the preforms with gripper running a suitable cam.

The stars 307, 308 provide for the transfer of heated preforms P to the blowing or stretch-blowing carousel 312. A preform fault check can be implemented on the first star 306 and a temperature check and respective rejection devices for non-conforming preforms can be implemented on the second star 307. Such control systems and devices are known to the person skilled in the art and will not be described in detail.

The central part of the heating system 301 comprises a rotating support frame 350 on which the carousel 303 is placed, in an integral rotation. The distribution stars 306, 307 are synchronized and tangent to the gripper 351, which in turn are joined to the carousel 303. The rotating frame 350 is powered by a drive 352.

The heating elements 304, configured to receive the preforms inside them, comprise said vertically movable grippers 351, which can take a raised engagement/disengagement position of the preforms P and a lowered position in which the preforms P are inserted into their respective heating bells 353. The grippers 351 are moved by actuators 354 capable of following a predefined law of motion. The actuators 354 are powered and controlled by power lines coming from a rotating collector 355 arranged, in the solution shown in the figures (see in particular FIGS. 13 and 13bis) on the rotation axis of the carousel 303, in the upper part. The electric rotating collector 355 comprises a first unit 355a and a second unit 355b for the distribution of power and control signals respectively to the drives 354, while its upper part is integral with the fixed frame of the entire machine.

Figure 10:
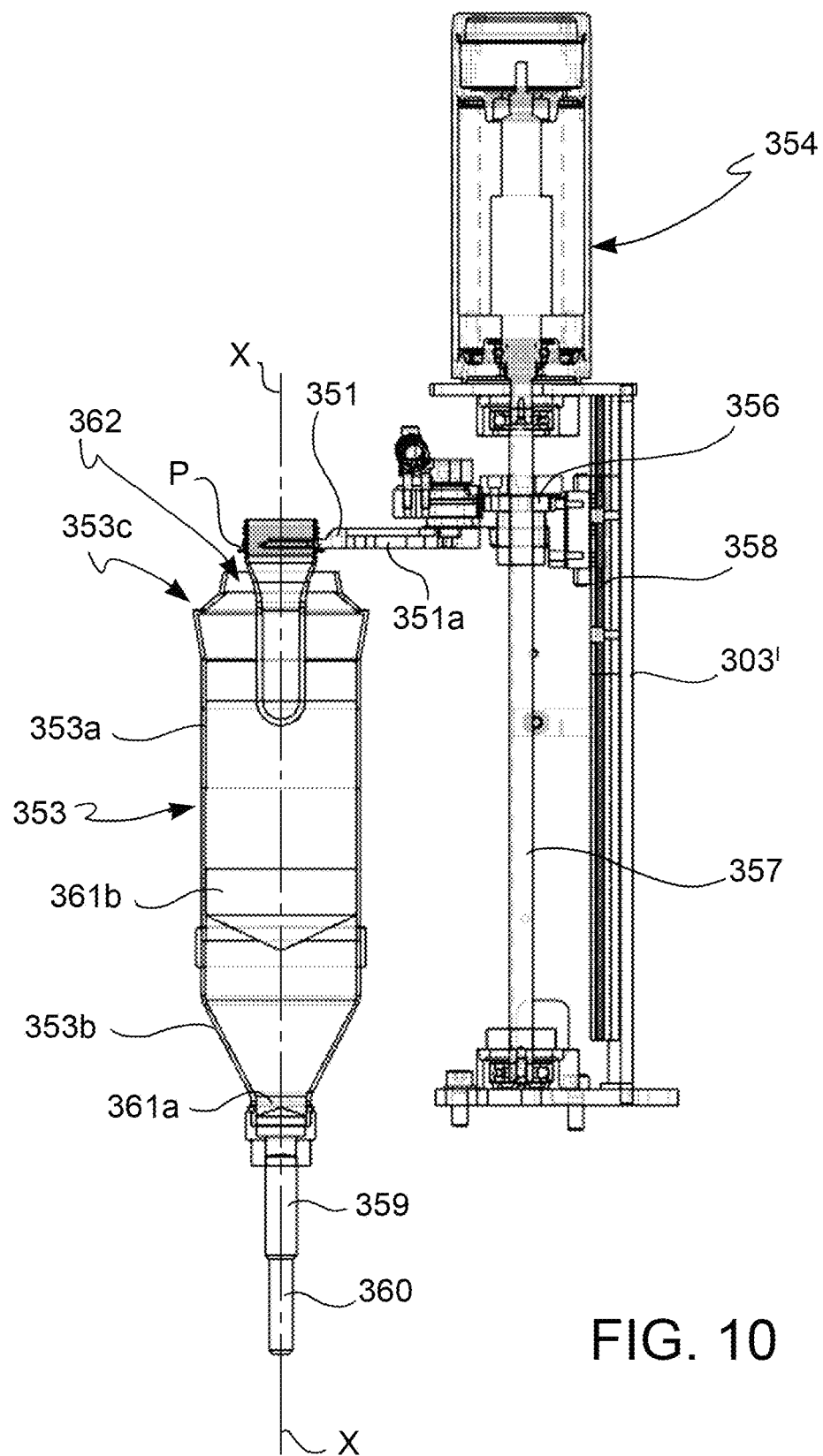
FIG. 10 is a diagrammatic side view of a preform heating element in the variant with external illumination.

The grippers 351 comprise two jaws 351a, 351b (only one jaw 351a is visible in FIG. 10) able to grip the preform in the cylindrical area just above the finishing element or either through the action of a spring or through the action of a special closing cam for gripping the preform from the star 306 and opening cam for releasing onto the star 307.

The vertical movement of each of the grippers 351 is operated by the dedicated actuator 354 (FIG. 10), preferably a stepper motor, servomotor, linear motor, or brushless motor powered by the electric collector 355. In this manner, it is possible to operate a specific law of motion to optimize the heating inside the preforms P.

The gripper 351 is supported by a holder 356 which is driven by a screw 357 and is guided by low-friction seats 358. In case of linear motor, the screw 357 is not present. The assembly consisting of the movable gripper 351, the actuator 354, the screw 357, and the low-friction seats 358 is mounted to a support structure 303' attached to the 303 carousel.

The heating bell 353 (FIGS. 10, 11, and 11bis) substantially comprises a cylindrical hollow body 353a, a conical portion 353b placed at one end of the body 353a, and a reflecting portion 353c at the opposite end of the body 353a.

The heating bell 353 has an opening 362, coaxial to the X-X axis of the bell, at the reflecting portion 353c, while it comprises a collimating member 359 at the end of the conical portion 353b.

Downstream of the optical path of the collimator member 359, the conical portion 353b of the heating bell 353 comprises a first lens or axicon 361a, located at the end of said conical portion 353b connected to the collimator member 359. A second lens or axicon 361b is located in the lower section of the cylindrical body 353a.

The lenses and axicons used are made of a material which exhibits an adequate refractive index in the radiation used so as to develop an appropriate geometry of the outgoing radiation beam, in the shape of a cylinder. The appropriate materials are, for example, but without limitation, those listed below: quartz, silica, magnesium fluoride, calcium fluoride, silicon, germanium or rare earth corundum or boron glass. The surfaces of these optical devices have a treatment required to reduce reflection in the opposite direction to that of radiation. Such optical devices are known to the industry expert and will not be described in detail.

The reflecting portion 353c comprises a system of truncated-cone-shaped reflecting surfaces 363a, 363b, 363c which comprise, in sequence from the body 353a towards the opening 362, a first truncated-cone-shaped reflecting surface 363a flared outwards, a second truncated-cone-shaped reflecting surface 363b converging towards the central axis X-X of the bell 353 and a third truncated-cone-shaped reflecting surface 363c converging towards the central axis X-X, where the first, second and third truncated-cone-shaped reflecting surfaces 363a, 363b, 363c are respectively inclined by an angle $\alpha$, by and angle $\beta$ and by an angle $\gamma$ with respect to respective cylindrical surfaces coaxial to axis X-X.

In particular, the angle $\alpha$ is smaller than the angle $\beta$ and is greater than or equal to the angle $\gamma$.

A substantially cylindrical 363d absorbent surface, obtained by coating the upper portion of the body 353a with highly absorbent substances in the infrared field, is placed between the body 353a and the first truncated-cone-shaped reflecting surface 363a. An example is a carbon or black oxide coating after having deposited a layer of zinc/molybdenum on the aluminum which allows the adhesion of highly absorbent and temperature resistant substances (of the order of 200° C.). Another example may be a surface treatment which makes the surface 363d a "meta-surface", i.e. which can trap most of the radiation in the most superficial layer by virtue of its particular structure produced through nanotechnologies. The collimator member 359 is powered by a optical fiber 360 which generates a collimated beam of infrared radiation, which is refracted by the two lenses or axicons 361a, 361b arranged in series, so as to generate a cylinder of R1 radiation with the appropriate degree of homogeneity. Alternatively, instead of refractive devices, such as axicon and lenses, it is possible to use diffractive optical elements, such as grids or nanostructures which utilize the phenomenon of diffraction and constructive and destructive interference.

Figure 11:
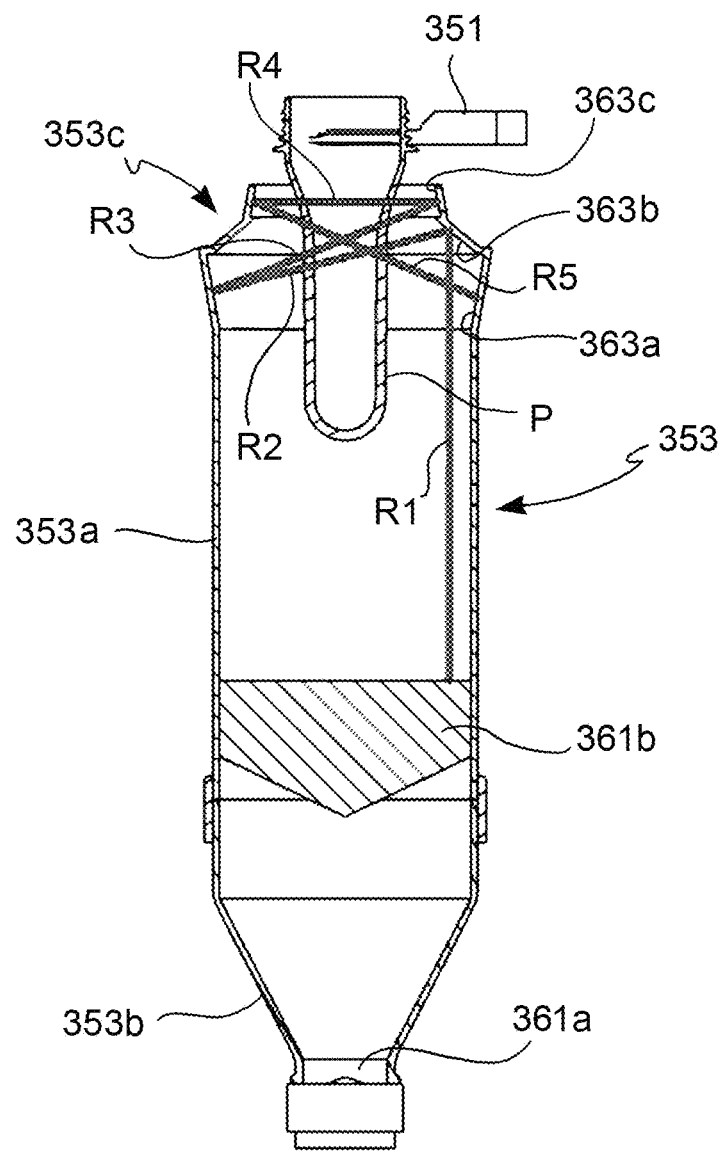
FIG. 11 is a side section view of the reflecting member of the embodiment in FIG. 10 with the expected path of the radiation rays indicated.

As detailed in FIG. 11, the radiation cylinder R1 illuminates the second truncated-cone-shaped reflecting surface 363b of the reflection portion 353c and is reflected on the first truncated-cone-shaped reflecting surface 363a (ray R2), then on the third truncated-cone-shaped reflecting surface 363c (ray R3) and then again along the rays R4 and R5. The appropriate radiation in the form of a radiation ring required for a heating operation according to the desired degree is achieved through various reflections between said truncated-cone-shaped reflecting surfaces 363a, 363b, 363c, and refractions in the thickness of the plastic material. This series of external and internal reflections leads to the appropriate absorption of radiation and, hence, to optimal heating of the material with much higher accuracy than current lamp heating systems. The temperature distribution and the respective gradients, by virtue of the phenomenon of heat deposition directly inside the material obtained from the physical phenomenon of the absorption of the electromagnetic radiation appropriate achieved by the geometry of the illuminator 353c and the choice of the appropriate wavelength, allow the system according to the invention to offer a heating quality and accuracy much higher than that available now. Finally, the band with highly absorbent treatment 363d placed on the metal cylinder absorbs any residual radiation which may escape from the light ring generated between the surfaces 363a, 363b, 363c to confine the heat generation to the upper part in this manner.

The reflecting surfaces can be made of highly reflecting coatings, for example, but not limited to gold, silver, or polished aluminum, and protected by a transparent layer, or may be made of dielectric multilayer material capable of increasing the reflectivity of the substrate. The outer structure of the heating bell 353, preferably made of metal material, ensures proper heat dissipation, absorption of dispersed radiation, and appropriate robustness.

The system of truncated-cone-shaped reflecting surfaces 363a, 363b, 363c, and their angles of inclination α, β, and γ are configured to trap most of the infrared radiation in the radiation ring shown in FIG. 11. In this manner, the heating of the irradiated preform P portion is optimized and the radiation which may return to the optical fiber 360 and from there to the laser source, which would otherwise be damaged, is minimized. To make the system of the invention non-dependent on the particular geometry of the preform, the highly absorbent band 363d confines the radiation to the upper part of the heating bell.

The vertical movement of the preform P, as mentioned, follows a predefined law of motion, not only to irradiate the entire preform P, excluding the neck above the finishing element but also to increase or decrease the irradiation time as a function of the portion of preform to be treated and the specific heating requirements. Furthermore, the laser source has its own modulability with a high degree of accuracy in addition to the variation in the sliding speed of the preform within the heating radiation circle.

The embodiment described hereto involves the vertical movement of the preform P, while the heating bell 353 remains vertically fixed. Alternatively, it is possible to keep the preform P and the respective gripper 351 fixed and to vertically move the heating bell 353, supported by an arm 451, with a similar actuator system 454, moving screw 457 and guides 458, as described above and as visible in FIGS. 12 and 12bis.

An optical collector 364 is placed inside the rotating support frame 350, in the lower part, which collector can transfer the radiation which feeds each heating bell 353 from each of the fixed laser sources located outside the carousel 365 (FIG. 1bis) to the respective heating bell 353. The optical collector 364 can alternatively be placed in the upper part of the carousel 303 according to the dimensions.

The optical collector 364 transfers the radiation of the optical fibers 366 from each of the laser sources to the corresponding rotating optical fibers 360, which supply the respective heating bells 353.

The optical collector 364 can be connected to a variety of laser sources. Alternatively, it is possible to provide an optical collector 364 which receives the radiation from a single laser source and distributes it according to appropriate proportions as a function of time to the various heating bells 353, that are in differing heating phases. Indeed, the various preforms enter the rotary carousel continuously and with an offset which makes it essential to modulate the infrared radiation for each preform P along its rotary path on the carousel. This modulation of the intensity of the radiation sent to each heating bell can take place through the use of photonic crystals which behave as switches and modulators of the intensity of the radiation which crosses them by virtue of variable electromagnetic fields which are applied to such crystals. In this manner, the radiation supplied by a single laser source, once distributed to the various heating units, can be activated and modulated in intensity by acting on the photonic crystal and obtaining the individual on/off and modulation for each preform according to its own heating phase and according to the specific concerned area.

A variant provides for a laser source for each heating bell 353, placing such laser sources directly on the carousel 303, which avoids the use of an optical collector 364.

It is also possible to place the optical collector 364 directly on the carousel, as described for the embodiment in FIG. 8.

In preferred embodiments (FIG. 12), the optical fiber 360 starts from the rotating part of the optical collector 364 and reaches the collimator member 359 of the heating bell 353. The optical fibers reach the terminals 366 of the optical collector 364 from the source of monochromatic electromagnetic radiation in the infrared field, with predefined wavelengths, either in the structure of the blowing machine or on the ground. Preferably, such a source of electromagnetic radiation is a laser device 365, in particular, a device with diode source, semiconductor source, or fiber source or solid-state laser.

In particularly preferred embodiments, the electromagnetic radiation emitted by the laser device 365 is within the previously defined wavelength ranges.

Also for this embodiment, it is possible to use the optical heating path to convey UV-C radiation from LED or laser devices to sterilize the preforms.

Figure 12:
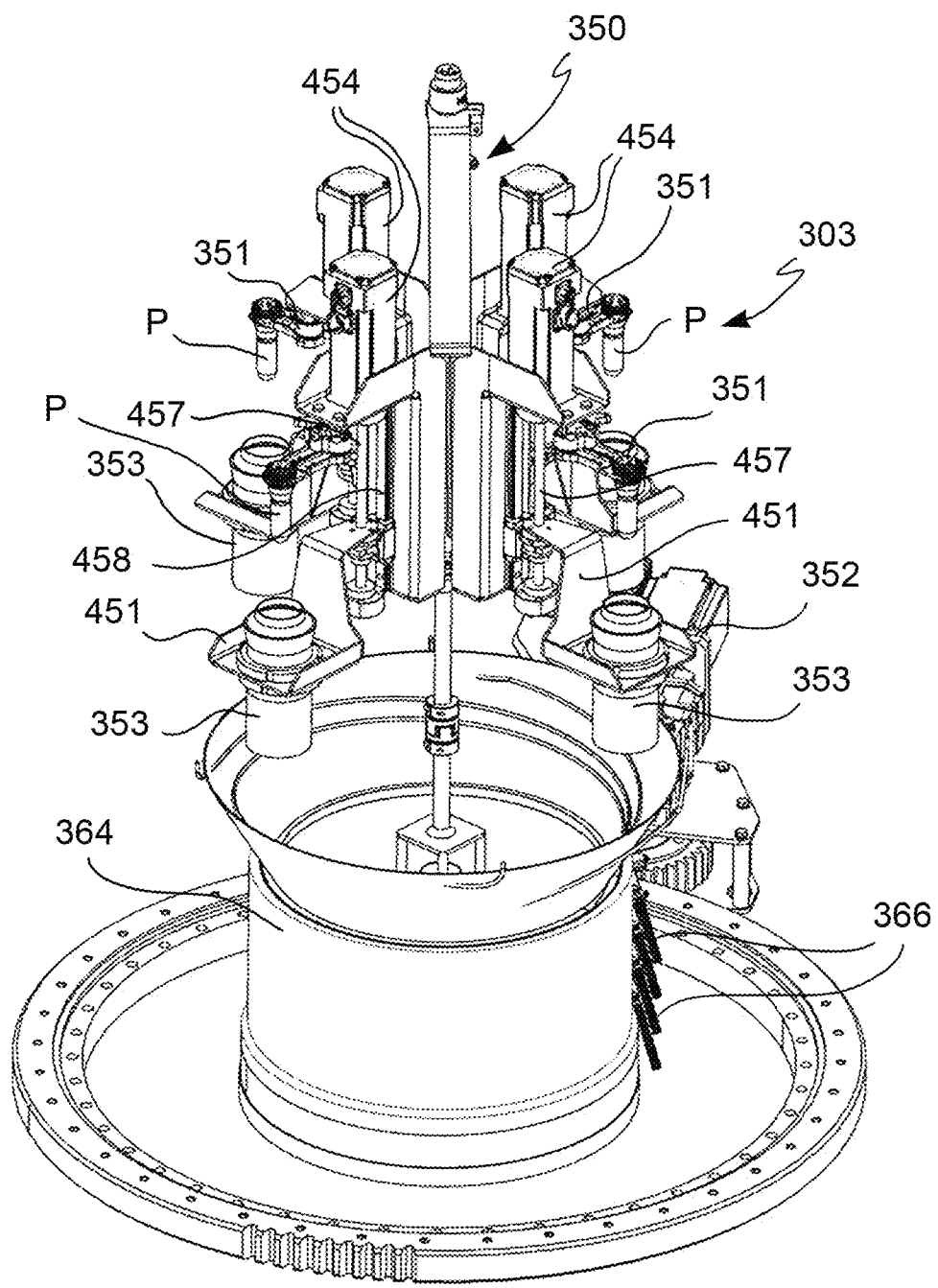
FIG. 12 is a perspective overall view of the heating carousel in the version with external lighting, movable illuminators, and fixed preforms.
Figure 13:
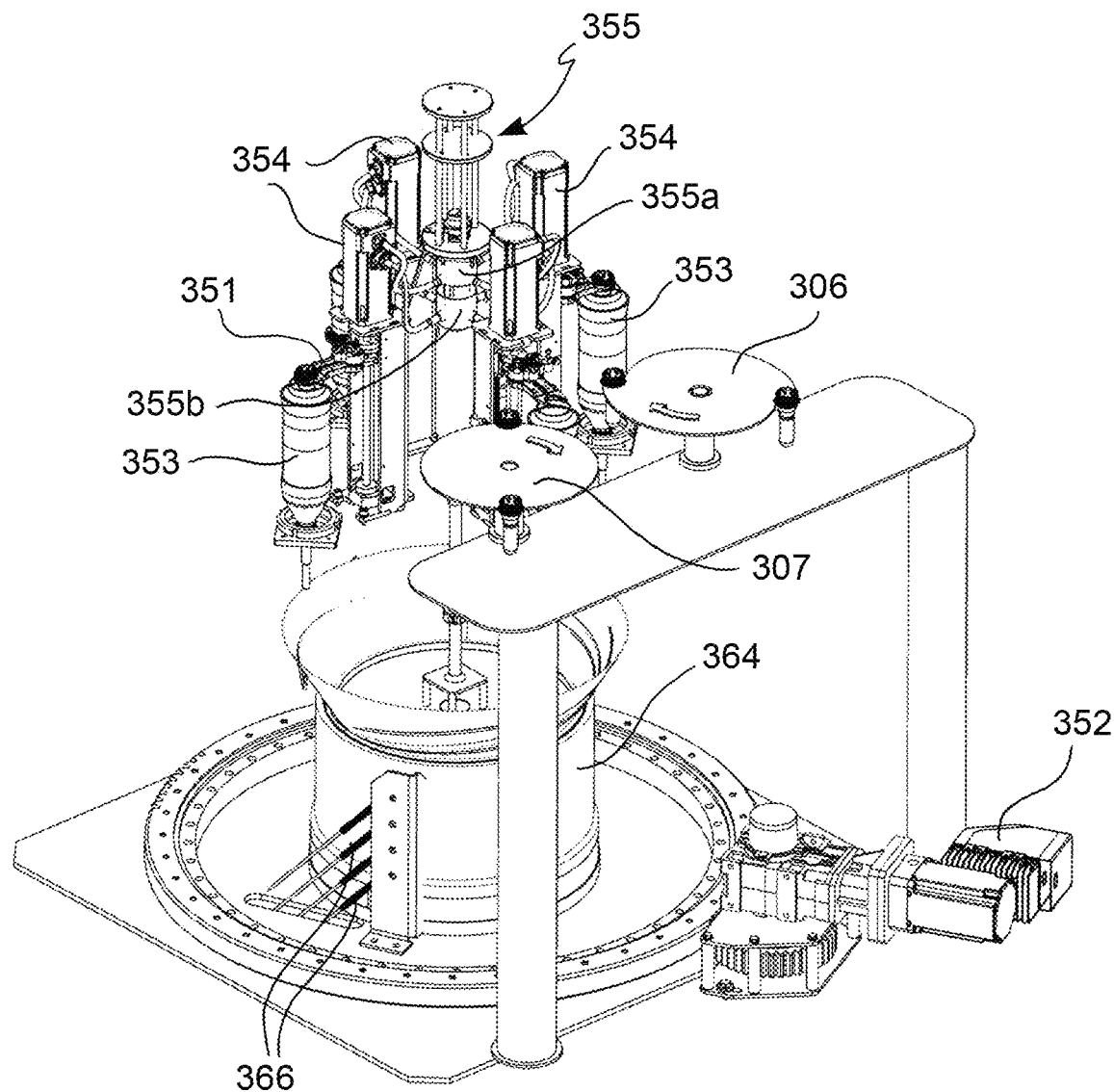
FIG. 13 is a perspective overall view of the heating carousel in the version with external lighting, fixed illuminators, and movable preforms.

FIGS. 12bis and 13bis show, respectively, the same embodiment as FIGS. 12 and 13, in which the lower portion of the machine comprising the optical collector 364 is enclosed in a containment base 370.

Many advantages can be obtained with the heating system of the invention.

The heating system of the invention allows to obtain:
high-energy efficiency, limiting heat loss both through the use of absorption wavelengths in predefined bands and through the presence of reflecting elements associated with each preform;
a maximum accuracy of the heating profile, as the heating bells 353 create a series of external and internal reflections, studied by virtue of the geometry of the truncated-cone-shaped surfaces 363a, 363b, 363c, which leads to the appropriate absorption of radiation and, from here, to an optimal heating of the material with an accuracy much higher than the current heating systems with lamps. The temperature distribution and the related gradients, by virtue of the phenomenon of heat deposition directly inside the material obtained by the correct penetration of the selected radiation, allow this invention to offer a heating quality much higher than that available now. Finally, the band with highly absorbent treatment 363d placed on the metal cylinder absorbs any residual radiation which may escape from the light ring generated between the surfaces 363a, 363b, 363c to confine the heat generation to the upper part in this manner.

a heating time of an order of magnitude shorter than current systems, which allows high performance of the plastic material and therefore an optimization of the amount of resin used;

a wide modulability of the heating, both by varying the intensity of the laser source and by varying the motion of the rod 18;

an absence of thermal inertia, which allows an instant restart and therefore a better efficiency of the entire production line;

the possibility of modulating the speed of the machine during the step of operating according to the trend of the production line, a feature not currently available in the ovens on the market;

the possibility of integrating a UV-C radiation source in the same optical path to pair the disinfection of the preform with the heating;

a substantial reduction in heat dissipation, with the consequence of saving cooling energy to maintain the working environment of the machine at the correct temperature and to avoid very hot surfaces, which are thus potentially dangerous for operators;

a substantial reduction in the size of the heating system compared to traditional preform ovens, while maintaining the same production capacity;

the use of a rotary oven has a better synchronization with the blowing carousel than with traditional ovens;

an absence of ionizing radiation (unless coupled with a UV-C radiation source), as the laser source is monochromatic in the infrared field, which prevents the formation of harmful substances inside the plastic of the preform.

It is apparent that only some particular embodiments of the present invention have been described, to which those skilled in the art will be able to make all changes required to adapt it to particular applications, without departing from the scope of protection of the present invention.

What we claim is:

1. A heating system for preforms, comprising a carousel for treating the preforms comprising a plurality of heating elements configured to be inserted either inside or outside each preform and to radiate electromagnetic radiation in the infrared field which forms, in such a device, a disc of radiation according to a radial symmetry with respect to the center of the axis of the preform.

2. The heating system according to claim 1, comprising a plurality of reflecting elements, each of said reflecting elements being configured to radiate a preform individually from the outside also with the radiation part emitted by the corresponding heating element, not absorbed by the preform and transmitted through the thickness of the preform.

3. The heating system according to claim 1, wherein the electromagnetic radiation is generated by a laser device comprising a diode source, a semi-conductor source or a fiber source.

4. The heating system according to claim 3, wherein the electromagnetic radiation emitted by the laser device is in the wavelength range of 1620-2100 nm.

5. The heating system according to claim 1, wherein each of the heating elements is configured to receive a preform therein and comprises a gripper vertically movable to take a raised engagement/disengagement position with the preform and a lowered position in which the preform is inserted into a heating bell, said gripper being moved by an actuator configured to follow a predefined law of motion, said actuator being a stepper motor, a servomotor, a linear motor or a brushless motor.

6. The heating system according to claim 1, wherein each of the heating elements is configured to receive a preform therein and comprises a vertically fixed gripper and a heating bell supported by an arm vertically movable by an actuator configured to follow a predefined law of motion, so as to take a raised position in which the preform is inserted in a heating bell and a lowered position, said actuator being a stepper motor, servomotor, linear motor or brushless motor.

7. The heating system according to claim 5, wherein said gripper is supported by a support which is moved by a screw and is guided by low-friction seats, the assembly comprising the movable gripper, the actuator, the screw and the low-friction seats being mounted to a support structure integral with the carousel.

8. The heating system according to claim 6, wherein said arm is moved by a screw and is guided by low-friction seats.

9. The heating system according to claim 5, wherein said heating bell comprises a substantially cylindrical hollow body, a conical portion placed at one end of the body and a reflecting portion placed at the opposite end of the body, and comprises an opening, coaxial to the longitudinal axis (X-X) of the heating bell, at the reflecting portion, and a collimating member at the end of the conical portion, the collimating member being connected to an optical fiber to deliver a collimated beam of infrared radiation with predefined wavelengths.

10. The heating system according to claim 9, wherein, downstream of the optical path of the collimator member, the conical portion of the heating bell comprises a first lens or axicon, placed at the end of said conical portion connected to the collimator member, and a second lens or axicon placed in the lower section of the cylindrical body, so as to generate a radiation cylinder with an appropriate degree of homogeneity.

11. The heating system according to claim 9, wherein the reflecting portion comprises a system of truncated-cone-shaped reflecting surfaces which comprise, in sequence from the cylindrical body towards the opening, a first truncated-cone-shaped reflecting surface flared outwards, a second truncated-cone-shaped reflecting surface converging towards the longitudinal axis (X-X) of the heating bell, and a third truncated-cone-shaped reflecting surface converging towards the longitudinal axis (X-X), wherein the first, second and third truncated-cone-shaped reflecting surfaces are inclined, respectively, by an angle α, an angle β and an angle γ with respect to respective cylindrical surfaces coaxial to the axis (X-X), wherein the angle α is smaller than the angle β and greater than or equal to the angle γ, and wherein there is a substantially cylindrical absorbing surface between the body and the first truncated-cone-shaped reflecting surface.

12. The heating system according to claim 5, comprising an optical collector configured to transfer the radiation which supplies each heating bell from a static laser source, or from several static laser sources, to each heating bell by means of said rotating optical fiber, wherein said optical collector is fixed or is placed on the carousel.

13. The heating system according to claim 5, comprising one laser source for each heating bell, said laser sources being placed on the carousel.

14. The heating system according to claim 1, comprising transmission means of a UV-C radiation, comprising a LED-emitted or LASER radiation, so as to obtain the simultaneous sterilization of the preforms.

15. A blowing or stretch-blowing machine comprising a preform heating system according to claim 1 and a blowing or stretch-blowing carousel, wherein the heating system comprises a handling system of the preforms into and out from the heating elements which comprises:
- at least one distribution star coupled to the carousel to feed the preforms to be heated to said grippers placed on the carousel, the distribution star receiving the preforms from a feeder placed downstream of a preform orienting device;
- a second distribution star to extract the heated preforms from the carousel and a third distribution star capable of varying the pitch of the preforms and transferring the preforms to said blowing or stretch-blowing carousel, said machine being included in a compact structure.

* * * * *